April 16, 1957  A. K. HAUSER  2,788,615
TRELLIS
Filed Sept. 17, 1953  2 Sheets-Sheet 1
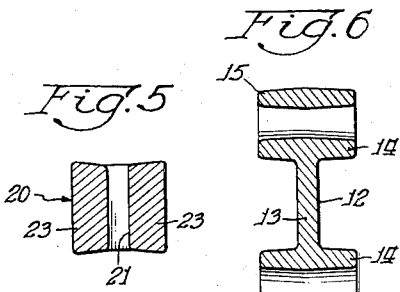
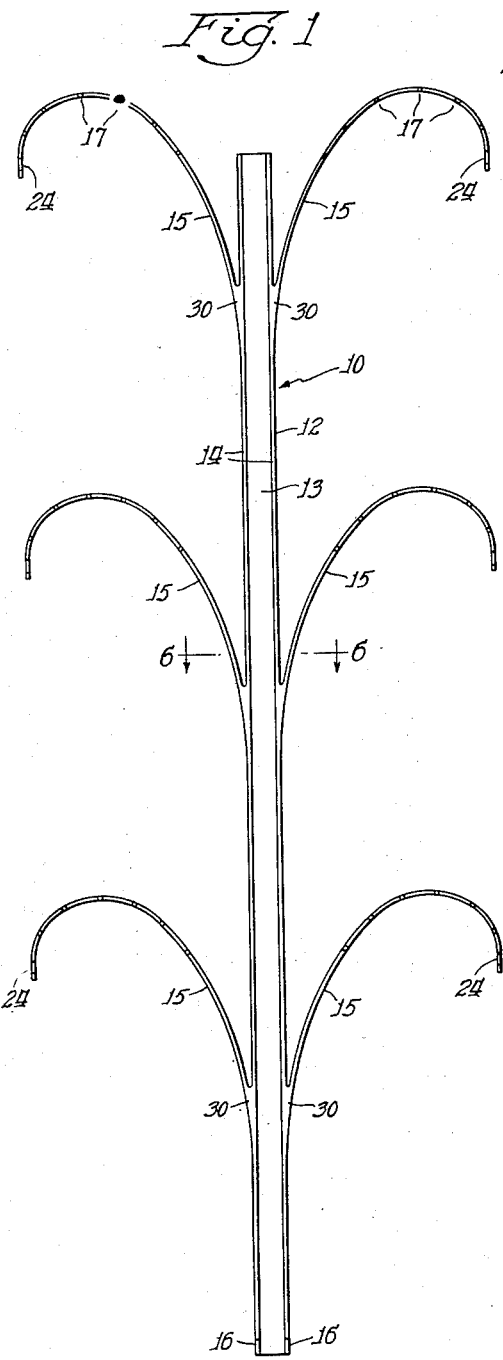
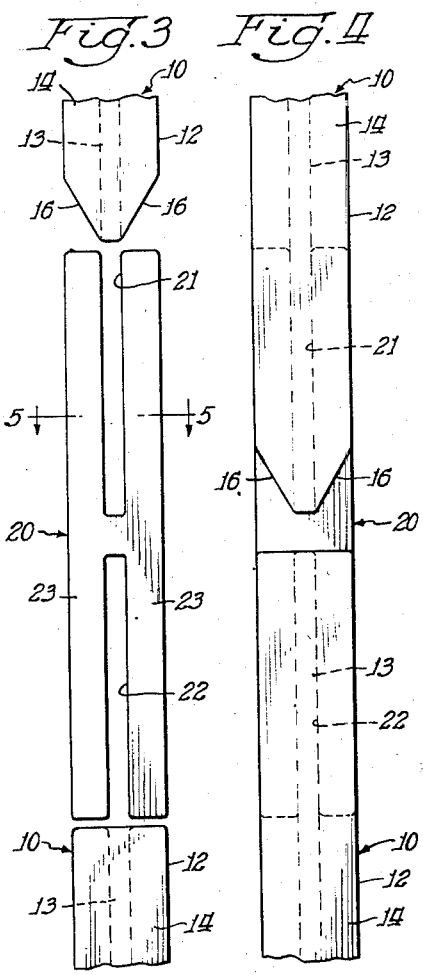
Inventor:
Alfred K. Hauser April 16, 1957 A. K. HAUSER 2,788,615
TRELLIS
Filed Sept. 17, 1953 2 Sheets-Sheet 2
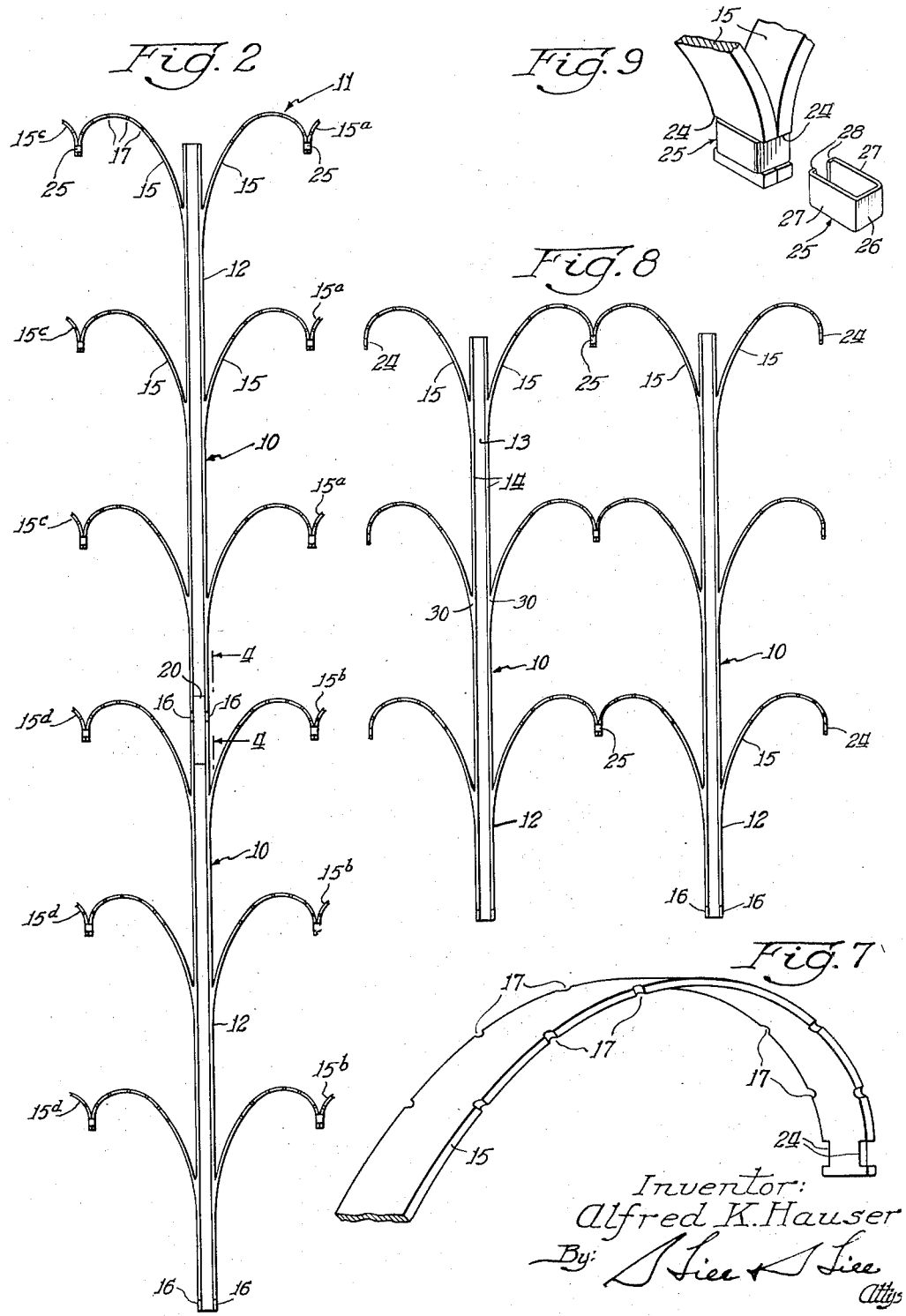

United States Patent Office 2,788,615
Patented Apr. 16, 1957

2,788,615
TRELLIS
Alfred K. Hauser, Chicago, Ill.
Application September 17, 1953, Serial No. 380,853
6 Claims. (Cl. 47—47)

This invention relates to a trellis structure and more particularly to a trellis structure which may be assembled into a multiple trellis arrangement and also to a trellis structure which may be arranged into a fence-like structure.

The invention has among its objects the production of a molded trellis structure which may be used individually as a support for vines or for staking plants and which, as the vines grow vertically, may be arranged in multiple lengths to suit the growth of the plants or vines, and also may be arranged laterally as the vines spread, and similarly assembled into a multiple height fence-like structure or multiple height and width trellis.

Another object of the invention is the production of a simple securing device for assembling single trellis structures into multiple height trellis structures.

Another object of the invention is to provide a trellis structure which may be assembled into a laterally extending trellis arrangement or fence, and to provide simple means for assembling laterally arranged trellis structures.

Still another object of the invention is to provide a trellis structure having laterally arranged vine-supporting arms which may be symmetrically arranged with respect to a center post and which are provided with means for locating ties for training or tieing the growing vines to the trellis structure.

Another object of the invention is to provide a trellis structure which may be readily fabricated from a thermoplastic, thermo-setting or chemical setting molding material in various preselected colors or combinations thereof, or from other suitable material which may be die-cast, or may be fabricated from wood or metal.

Another object of the invention is to provide a trellis structure which is simple in construction, attractive in appearance, relatively inexpensive to manufacture, and which may be assembled into various vertical and lateral arrangements, and which is efficient and durable in use for the purpose intended.

In order to accomplish the various objects of my invention, it is preferred to fabricate a trellis structure from a suitable molding material, for example, of various polymeric organic compounds, phenol-formaldehyde resins, acrylic resins, and other suitable materials which may be thermo-setting, thermo-plastic, or chemical-setting, which will provide a substantially rigid and flexible structure which will not easily break when assembled into the various arrangements for which the trellis structure of this invention is adapted. It is preferred to form the trellis structure with a vertical center post of a suitable structural shape to give rigidity to the structure, and it is preferred to provide laterally arranged vine-supporting arms having a substantially upwardly divergent arrangement at the point at which the arms are affixed to the center post with the outer ends of the arms curved downwardly to provide a suitable lattice work structure upon which the vines may be strung, or to provide a suitable lattice work structure when the trellis structure is arranged into a fence or laterally extending trellis arrangement. It is preferred to provide a simple attaching device for vertically assembling the trellis structure into a multiple vertical trellis arrangement, and also to provide a simple securing structure for affixing the free ends of the arms together to provide a fence-like arrangement or laterally extending trellis arrangement which may also be assembled into a multiple height structure. It is also proposed to provide notches arranged along an edge or both edges of the arms to provide means for affixing ties for the vines thereto to prevent movement of the ties along the arms. Although it is preferred to provide the arms symmetrical with respect to the center post, the arms may be arranged in any simple arrangement in which laterally spaced trellis structures may be laterally assembled with the arms taking any shape to provide an ornamental structure.

Many other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

In the drawings, wherein like reference characters indicate like or corresponding parts:

Fig. 1 is a front elevational view illustrating a trellis structure of my invention;

Fig. 2 is a view in elevation illustrating a multiple height and laterally extending trellis arrangement utilizing the trellis structure of Fig. 1;

Fig. 3 is an exploded view illustrating the device for assembling the trellis structure of Fig. 1 into the multiple trellis structure of Fig. 2;

Fig. 4 is an enlarged view taken substantially along the line 4—4 illustrating the device for assembling in the assembled position between contiguous vertical trellis structures of Fig. 2;

Fig. 5 is a view taken along the line 5—5 of Fig. 3, illustrating the cross-section of the assembling device for the vertical arrangement of the trellis structures of Fig. 2;

Fig. 6 is an enlarged view partly in cross section, taken along the line 6—6 of Fig. 1;

Fig. 7 is an enlarged view in perspective illustrating a vine-supporting arm and the means for affixing the vine ties to the arms to prevent slippage;

Fig. 8 is a view in elevation illustrating the assembly of laterally arranged trellis structures into a fence-like or laterally extending trellis arrangement; and Fig. 9 is an exploded view illustrating the securing means for affixing the free ends of the laterally extending arms of the trellis arrangement of Fig. 8 together.

Referring to the drawings, particularly Figs. 1 through 7, a trellis structure 10 is illustrated which may be readily assembled into a multiple height trellis structure 11 of Fig. 2 as illustrated, comprising two or more similarly formed trellis sections 10. Although for the purpose of illustration, the trellis structure has been illustrated as only comprising two trellis structures, it is obvious that it is within the scope of the invention that the structures may be assembled to any height desired by vertically stacking the structures or laterally arranging a series of multiple height trellis structures as hereinafter described.

Each trellis structure preferably comprises a center post 12 of suitable cross section, or as illustrated in Fig. 6, which may be substantially H-shaped or I-shaped in cross section. The structural section used shall preferably be such as to give the greatest rigidity for the amount of material used, and which may be readily molded under heat and pressure from suitable plastic materials which are commercially available. The center post 12 preferably comprises a center web 13 and transversely arranged rib portions 14. The rib portions are provided with suitable draft to permit ease in molding. Laterally extending arms 15 are vertically positioned longitudinally of the center post 12 and in the particular embodiment shown preferably comprise three pairs of the symmetrically arranged arms. It is to be understood that the arrangement may be such as to provide an ornamental appearance when used singly for staking plants, such as tomato plants and the like, or for use as a multiple trellis structure as illustrated in Fig. 2.

Although, as illustrated, the arms are equally spaced along the center post and symmetrically arranged opposite to each other, it is to be understood that they may be staggered or otherwise arranged without departing from the scope of the invention. In the arrangement illustrated, the upper pair of arms are illustrated as extending above the top of the center post as illustrated in Fig. 1. The trellis structure provides a section for multiple height trellis structures of approximately three feet per section and a width of substantially two feet. It is to be understood that any suitable height and width may be used as desired to form any arrangement of trellis structure into which the sections may be fabricated. The lower end of the center post is beveled at 16 on both sides of the ribs to provide a pointed center post to be inserted readily in the ground, and the length of the center post below the lower arms 15 is such that the center posts may be suitably embedded in the ground to give sufficient support to the trellis arrangement or fence-like structure without requiring any additional bracing.

Referring to Figs. 1, 2, and 7, each of the arms may be provided with notches 17 along each edge of the arm to provide suitable means to which the ties (not shown) are secured for affixing or training the vines to the arms of the trellis structure. Although the notches 17 are illustrated as shown, any other suitable arrangement may be provided and it is equally within the scope of the invention that the notches may be only applied to a single edge rather than to both edges, or the notches may be left off. It is preferred to form the notches, if desired, as the trellis structure is molded.

Referring to Figs. 2 through 6, I have provided a simple device 20 for vertically assembling the trellis structure of Fig. 1 into a multiple height trellis structure 11 of Fig. 2. The securing device 20, Fig. 3, is preferably H-shaped as shown and comprises an upper slot 21 which is complementally formed to frictionally receive the web 13 of the lower end of an upper trellis structure 10, which is to be stacked upon an upper end of a contiguous lower trellis structure as illustrated in Figs. 2, 3, and 4 by affixing a similar lower slot 22 to the web of that trellis structure. The width and shape of the securing device 20, Fig. 5, are such that the sides 23 are complementally formed to be inserted between the rib portions 14 of Fig. 6 with the web 13 of the center post 12 being inserted within the groove 21 or 22, depending upon whether it is the top or bottom of a center post of a contiguous trellis arrangement into which the trellis structures have been assembled to any predetermined height. Referring to Figs. 2 and 4, the contiguous trellis structures are shown assembled to the H-shaped securing device so that they are frictionally and detachably assembled. As illustrated in Fig. 2, two sections are illustrated as being assembled vertically, and it is within the scope of the invention that the trellis arrangement may be assembled to any suitable height, using the securing devices 20 for frictionally assembling the structures. It is also within the scope of the invention that to additionally secure the assembled structures where necessary, suitable securing means (not shown) such as bolts and nuts may be affixed through suitably arranged holes in the upper and lower ends of the web 13 of the center post and the sides 23 of the securing device 20, as is well understood in the various arts. It is obvious that a simple trellis arrangement has been illustrated which may be shipped in single sections to reduce the size of the package and then assembled to whatever height desired, and which may then be readily disassembled when desired and conveniently stored away for future use.

Referring to Figs. 8 and 9, I have illustrated trellis structures 10 arranged to be laterally assembled to create a fence-like structure or a laterally extending trellis structure of any length desired, or any arrangement of two or more laterally assembled trellis structures which, in turn, may be vertically assembled to form multiple height trellis arrangements of two or more vertical trellis structures vertically assembled and then additionally laterally assembled into any suitable arrangement. When assembled to a single height, as shown in Fig. 8, they provide a simple fence-like structure for fencing in a yard or flower beds, or for other similar uses. In the arrangement as shown in Fig. 8, each trellis structure 10 is constructed as described with reference to Figs. 1 through 7. In addition, however, to provide simple means for laterally securing the trellis structures together, I have provided each arm 15 at the outer ends with oppositely formed notches 24, as illustrated in Figs. 1, 2, 7, and 9. The U-shaped keeper 25 is complementally formed so that a base 26 thereof is assembled in the notches 24 of contiguous edges of adjacent arms, and the legs 27 of the keeper are assembled along the faces of the arms, Fig. 9, and inturned edges 28 are locked within the opposite grooves 24 of adjacent arms. It is preferred that the keeper shall be formed from suitable metal, such as spring steel, and heat-treated to form a rigid keeper for affixing contiguous arms 15 of the laterally spaced trellis structures 10 together, as illustrated in Fig. 8.

Although the trellis structures have been particularly described to provide a single height fence-like structure, as illustrated in Fig. 8, it is understood that it is within the scope of the invention that multiple height and width trellis structures may be assembled, as illustrated, by combining with the multiple height trellis structure of Fig. 2, the multiple width structure of Fig. 8. In order to do this, trellis structures 10 may be added, for example, as identified by the arms 15a and 15b, trellis structures to the right of the multiple height trellis structure of Fig. 2 and, similarly, trellis structures identified by the arms 15c may be added to the left and, similarly, a trellis structure identified by the arms 15d may be added to the left side of the lower trellis structure. It is also within the scope of the invention that arch-like arrangements may be formed, for example, by adding only an upper trellis structure intermediate between two multiple height trellis structures, either on the right or left hand side. Similarly, another trellis arrangement could be formed by assembling an intermediate lower trellis structure between two multiple height trellis structures. It is also obvious that it is within the scope of the invention that any arrangement of trellis structures may be formed which is within the skill of the one erecting the trellis structure or fence-like structure, and as it is desired to train the vines thereon.

The trellis structure of this invention, although described as being arranged with symmetrically arranged arms which diverge outwardly at an angle to the center post 12 where they are affixed to the center post and curved downwardly at the outer ends, it is also to be understood that it is within the scope of the invention that any other suitable shape of arm may be used. Although the invention has been described with reference to a flat, strip-like, elongated arm of substantially rectangular cross section, it is to be understood that any shaped arm may be used which may be readily molded. It is preferred in integrally molding the structure that the juncture at which each arm 15 joins the ribs 14 shall be reinforced as illustrated at 30, Fig. 1.

Although the trellis structure of this invention has been described as being molded from suitable plastic material under heat and pressure suitable for the material, it is to be understood that it is within the scope of the invention that the trellis structure may be die-cast or molded from suitable metals or fabricated from suitable standard sections in steel, and have fabricated thereto the arms 15 suitably formed from strap metal and the like, welded or otherwise affixed to the center post. It is also within the scope of the invention that the trellis structure may be fabricated from wood in its entirety or from a combination of wood center posts and metal arms.

While I have illustrated a trellis structure preferably fabricated from a suitable molded plastic in a simple section, it is within the scope of the invention that the trellis structure may be suitably molded in multiple sections. However, for economy in molding and fabrication, it is proposed to fabricate a simple trellis structure as described which may be assembled into multiple height trellis structures, using suitable securing devices for affixing the contiguous center posts together, and also using suitable securing means for assembling the outer ends of the arms of the trellis structures when it is desired to arrange the trellis structures into a laterally extending trellis of fence-like structure.

Although the invention has been preferably described to be suitable for erecting a fence-like structure similar to various wire fencing and the like, it is to be understood that it is within the scope of the invention that the trellis structure may be fabricated in miniature for mounting within flower pots and boxes for training small vines within the home, and to permit the formation of ornamental trellises for training plants within the home. The trellis structures of this invention are such that they may be fabricated or cut to any suitable length and the severed lengths reassembled by using the assembly devices of Figs. 3, 4, and 9. It will also be apparent from the above disclosure that I have provided a trellis structure which is relatively simple in construction, attractive in appearance, and may be assembled into many ornamental arrangements.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A molded plastic trellis structure comprising a plastic H-shaped center post comprising a web portion and rib portions, a plurality of pairs of vertically spaced plastic arms arranged on the opposite sides of the rib portions and integrally molded thereto, said arms substantially the same width as said ribs, said arms diverging upwardly at an angle to the center post and curving downwardly at their outer ends, and the outer ends of the arms on each of the opposite sides being in vertical alignment and the outer ends of the arms of each pair being in horizontal alignment.

2. A molded device for assembling molded plastic trellis structures into a multiple height trellis arrangement, each of said trellis structures comprising a plastic H-shaped center post having a web portion and rib portions, and said device formed of plastic and with opposed slots for frictionally receiving the web portions of contiguous trellis structures with the remainder of the device complementally formed to be received within the space between the rib portions on opposite sides of the web portion.

3. A multiple height molded plastic trellis arrangement comprising at least two molded plastic trellis structures, each of said trellis structures comprising a plastic center post and vertically spaced and laterally arranged plastic arms integrally molded with the center post, and an H-shaped molded plastic securing means complementally formed to the contiguous ends of the center posts to be affixed together for frictionally affixing contiguous vertically positioned molded plastic trellis structures together.

4. A trellis structure adapted to form a multiple length trellis arrangement, each preformed molded plastic trellis structure comprising a plastic center post, laterally extending vertically spaced plastic arms affixed to the center post, and a notch formed at the end of each of the arms whereby laterally positioned trellis structures are adapted to be affixed together at each of the arms, and securing means complementally formed to be affixed to the notches of contiguous arms when the trellis structures are longitudinally arranged for affixing contiguous trellis structures together.

5. A molded plastic trellis structure adapted for assembling contiguous vertically arranged and laterally arranged molded plastic trellis structures in a multiple height arrangement and longitudinally extending arrangement, each of said molded plastic trellis structures including a plastic center post and symmetrically arranged laterally extending plastic arms, molded plastic securing means complementally formed to the ends of the center post for affixing molded plastic trellis structures together vertically, and securing means complementally formed to the ends of the arms for affixing contiguous laterally arranged molded plastic trellis structures together, whereby an ornamental trellis arrangement including vertically and laterally arranged molded plastic trellis structures is formed.

6. A molded trellis structure comprising a center post including a longitudinally extending web portion and integrally formed transversely extending longitudinal ribs portions, each end of said center post being complementally formed for vertically assembling more than one trellis structure, a plurality of vertically spaced and symmetrically arranged strip-like arms integrally molded to the longitudinal rib portions, said arms diverging upwardly at an angle to the center post and curving downwardly at their outer ends, the outer ends of the arms on opposite sides in vertical and horizontal alignment, and similarly formed means provided on the arms at the outer ends thereof for receiving securing means, whereby similar trellis structures may be laterally affixed together at the ends of the arms.

References Cited in the file of this patent

UNITED STATES PATENTS

| D. 1,522 | Hayes | Feb. 4, 1862 |
| 1,311,136 | Parr | July 22, 1919 |
| 2,024,546 | Starkey | Dec. 17, 1935 |
| 2,418,151 | Anderson | Apr. 1, 1947 |
| 2,476,689 | Wakefield | July 19, 1949 |
| 2,618,902 | Prescott | Nov. 25, 1952 |

FOREIGN PATENTS

| 18,735 | Germany | Aug. 23, 1882 |
| 129,010 | Sweden | May 17, 1950 |